United States Patent [19]
Horikawa

[11] Patent Number: 4,571,493
[45] Date of Patent: Feb. 18, 1986

[54] RADIATION IMAGE READ-OUT METHOD

[75] Inventor: Kazuo Horikawa, Kanagawa, Japan

[73] Assignee: Fuji Photo Film Co., Ltd., Kanawaga, Japan

[21] Appl. No.: 621,652

[22] Filed: Jun. 18, 1984

[30] Foreign Application Priority Data

Jun. 16, 1983 [JP] Japan .................... 58-108238

[51] Int. Cl.⁴ .............................................. G03C 5/16
[52] U.S. Cl. ............................................... 250/327.2
[58] Field of Search ................. 250/327.2, 484.1; 364/414

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,369,367 | 1/1983 | Horikawa et al. | 250/327.2 |
| 4,387,428 | 6/1983 | Ishida et al. | 364/414 |
| 4,527,061 | 7/1985 | Horikawa et al. | 250/327.2 |

Primary Examiner—Janice A. Howell
Attorney, Agent, or Firm—Sughrue, Mion, Zinn, Macpeak & Seas

[57] ABSTRACT

A stimulable phosphor sheet carrying a radiation image stored therein is scanned by stimulating rays which cause the stimulable phosphor sheet to emit light in proportion to the stored radiation energy. The emitted light is photoelectrically detected to obtain an electric image signal of the radiation image. A signal amount corresponding to after-glows emitted by the stimulable phosphor sheet and photoelectrically detected when the stimulating rays exist outside of the stimulable phosphor sheet after scanning along at least one scan line is conducted is subtracted from an amount of electric image signal photoelectrically detected when the stimulable phosphor sheet is scanned by the stimulating rays, thereby accurately obtaining an image signal representing the radiation image for use in reproduction of a visible image.

5 Claims, 8 Drawing Figures

RADIATION IMAGE READ-OUT METHOD

BACKGROUND OF THE INVENTION

1. Field of the Invention

This invention relates to a method of reading out a radiation image stored in a stimulable phosphor sheet. This invention particularly relates to a radiation image read-out method wherein light emitted by the stimulable phosphor sheet upon stimulation thereof in proportion to the radiation energy stored is detected accurately.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image having an improved quality, particularly a high diagnostic efficiency and accuracy.

FIG. 1 is a schematic view showing an example of a radiation image read-out apparatus employed in the aforesaid radiation image recording and reproducing system.

In the apparatus of FIG. 1, a laser beam $1a$ of a predetermined intensity is emitted as stimulating rays from a laser beam source 1 to a galvanometer mirror 2. The laser beam $1a$ is deflected by the galvanometer mirror 2 to form a laser beam $1b$ impinging upon a stimulable phosphor sheet 3 positioned below the galvanometer mirror 2 so that the sheet 3 is scanned by the laser beam $1b$ in the main scanning direction, i.e. in the width direction of the sheet 3 as indicated by the arrow A. While the laser beam $1b$ impinges upon the stimulable phosphor sheet 3, the sheet 3 is conveyed in the sub-scanning direction as indicated by the arrow B, for example, by an endless belt device 9. Therefore, scanning in the main scanning direction is repeated at an angle approximately normal to the sub-scanning direction, and the whole surface of the stimulable phosphor sheet 3 is two-dimensionally scanned by the laser beam $1b$. As the stimulable phosphor sheet 3 is scanned by the laser beam $1b$, the portion of the sheet 3 exposed to the laser beam $1b$ emits light having an intensity proportional to the radiation energy stored. The light emitted by the stimulable phosphor sheet 3 enters a transparent light guide member 4 from its front end face $4a$ positioned close to the sheet 3 in parallel to the main scanning line. The light guide member 4 has a flat-shaped front end portion $4b$ positioned close to the stimulable phosphor sheet 3 and is shaped gradually into a cylindrical shape towards the rear end side to form an approximately cylindrical rear end portion $4c$ which is closely contacted with a photomultiplier 5. The light emitted by the stimulable phosphor sheet 3 upon stimulation thereof and entering the light guide member 4 from its front end face $4a$ is guided inside of the light guide member 4 up to the rear end portion $4c$, and received by the photomultiplier 5. Thus the light emitted by the stimulable phosphor sheet 3 in proportion to the radiation energy stored therein is detected and converted into an electric image signal by the photomultiplier 5. The electric image signal thus obtained is sent to an image processing circuit 6 and processed therein. The electric image signal thus processed is then reproduced into a visible image and displayed, for example, on a CRT 7, or stored in a magnetic tape 8, or directly reproduced as a hard copy on a photographic material or the like.

In this manner, the radiation image stored in the stimulable phosphor sheet 3 is read out. However, since the front end face $4a$ of the light guide member 4 extends approximately over the entire width of the stimulable phosphor sheet 3 in parallel to the main scan line thereon, all light emitted from the portions of the stimulable phosphor sheet 3 covered by the front end face $4a$ enters the light guide member 4 from the front end face $4a$ and is detected by the photomultiplier 5. That is, not only the light emitted from the portion of the stimulable phosphor sheet 3 upon which the laser beam $1b$ impinges at any given instant, in proportion to the radiation energy stored in that portion, but also the other light emitted as described below from the portions of the sheet 3 covered by the front end face $4a$ enter the light guide member 4 and are detected by the photomultiplier 5. The light other than the light emitted from the portion of the stimulable phosphor sheet 3 upon which the laser beam $1b$ impinges currently in proportion to the radiation energy stored in that portion embraces after-glows emitted by the stimulable phosphor sheet 3. The after-glows are divided into an instantaneous light emission after-glow and a stimulated light emission after-glow.

By "instantaneous light emission after-glow" is meant the after-glow of light instantaneously emitted by a stimulable phosphor sheet when the sheet is exposed to a radiation to have a radiation image stored in the sheet, the after-glow continuing to be emitted by the sheet while the light intensity decays after the exposure of the sheet to the radiation is ceased. The characteristics of the instantaneous light emission after-glow are generally as shown in FIG. 2, though they will differ depending on the type of the stimulable phosphor constituting the stimulable phosphor sheet. In the graph of FIG. 2, the ordinate represents the intensity of light emission and the abscissa represents time (t). As shown in FIG. 2, when the exposure of a stimulable phosphor sheet to a radiation is ceased after the sheet is exposed to the radiation for a period of $\Delta t2$ from a time $t1$ to a time $t2$, the intensity of light instantaneously emitted by the sheet at a light emission intensity A does not immediately decreases to zero, but instead an instantaneous light emission after-glow continues while the intensity thereof decreases along an exponential function curve the time constant of which increases gradually.

For example, decay of the light emission intensity of the instantaneous light emission after-glow is such that a light emission intensity B of the instantaneous light emission after-glow at a time t3 approximately 180 seconds after the exposure of a stimulable phosphor sheet to a radiation is ceased (i.e. t3−t2=180 seconds) is approximately $10^{-4}$ times the intensity of light emitted by the sheet when the sheet is exposed to stimulating rays.

Accordingly, in the case where a predetermined time elapses from when a stimulable phosphor sheet is exposed to a radiation passing through an object to have a radiation image stored in the sheet to when read-out of the radiation image stored is conducted, the intensity of the instantaneous light emission after-glow decreases sufficiently and the effect of the after-glow becomes negligible in the read-out step. However, when read-out of the radiation image is conducted immediately after the radiation image is stored in the stimulable phosphor sheet, for example when a built-in type radiation image recording and reproducing system wherein an image recording section and an image read-out section are installed integrally to record and read out many radiation images continuously and quickly is employed, the light emission intensity of the instantaneous light emission afterglow does not decay sufficiently before image read-out is conducted. As a result, the instantaneous light emission after-glow is detected together with the light emitted by the stimulable phosphor sheet in proportion to the radiation energy stored when the sheet is exposed to stimulating rays, and the effect of the instantaneous light emission after-glow on the electric image signals obtained thereby becomes large.

Further, the light emission by the stimulable phosphor sheet upon stimulation thereof by stimulating rays arises from a portion having a very small area upon which the stimulating rays impinge, whereas the instantaneous light emission after-glow is emitted from the whole surface of the stimulable phosphor sheet exposed to a radiation. Therefore, as the stimulable phosphor sheet 3 is scanned point by point by the laser beam 1b as shown in FIG. 1, the light emitted from a portion of the sheet 3 upon which the laser beam 1b impinges momentarily in proportion to the radiation energy stored in that portion and the instantaneous light emission afterglow emitted from all of the portions covered by the front end face 4a of the light guide member 4 simultaneously enter the light guide member 4 from the front end face 4a and are guided to the photomultiplier 5. In this case, since the area of the portions covered by the front end face 4a of the light guide member 4 is markedly larger than the area of the portion of the stimulable phosphor sheet 3 upon which the laser beam 1b impinges momentarily, the amount of the instantaneous light emission after-glow guided to the photomultiplier 5 becomes not negligible even though a predetermined time elapses after the exposure of the stimulable phosphor sheet 3 to a radiation is ceased and the intensity of the instantaneous light emission after-glow becomes negligibly low as compared with the intensity of the light emitted by the sheet 3 upon stimulation thereof.

By "stimulated light emission after-glow" is meant the after-glow of light emitted by a stimulable phosphor sheet carrying a radiation image stored therein when the sheet is exposed to stimulating rays (e.g. a laser beam) for reading out the radiation image, the afterglow continuing to be emitted by the sheet while the light intensity decays after the exposure of the sheet to the stimulating rays is ceased. The characteristics of the stimulated light emission after-glow are generally as shown in FIG. 3, though they will differ depending on the type of the stimulable phosphor constituting the stimulable phosphor sheet. In the graph of FIG. 3, the ordinate represents the intensity of light emission and the abscissa represents the time (t). As shown in FIG. 3, when the exposure of a stimulable phosphor sheet to stimulating rays is ceased after the sheet is exposed to the stimulating rays for a period of Δt5 from a time t4 to a time t5, the intensity of light emitted by the sheet upon stimulation thereof at a light emission intensity C does not immediately decreases to zero, but instead a stimulated light emission after-glow continues while the intensity thereof decreases along an exponential function curve with the time constant thereof increasing gradually. (That is, the light intensity decreases rapidly at the beginning and thereafter the rate of decrease in the light intensity becomes gradually lower.)

For example, decay of the light emission intensity of the stimulated light emission after-glow is such that the initial time constant is approximately one microsecond, i.e. the time t6−t5 required for the light emission intensity to become 1/e (D/C=1/e) is approximately one microsecond. In general, since the speed of scanning (in the main scanning direction) of a stimulable phosphor sheet by stimulating rays by use of a galvanometer mirror is approximately 50Hz, it takes approximately 20,000 microseconds for scanning one time. Accordingly, the intensity of the stimulated light emission afterglow decaying along an exponential function curve with the initial time constant of one microsecond becomes very low as compared with the intensity of the light emitted by the stimulable phosphor sheet upon stimulation thereof when the sheet is exposed to the stimulating rays. Thus the intensity of the stimulated light emission after-glow at each point of the stimulable phosphor sheet becomes almost negligible.

However, the light emission by the stimulable phosphor sheet upon stimulation thereof when the sheet is exposed to stimulating rays arises from a portion having a very small area upon which the stimulating rays impinge, whereas the stimulated light emission after-glow is emitted from the whole surface of the stimulable phosphor sheet scanned by the stimulating rays. Therefore, as the stimulable phosphor sheet 3 is scanned point by point by the laser beam 1b as shown in FIG. 1, the light emitted from a portion of the sheet 3 upon which the laser beam 1b impinges momentarily in proportion to the radiation energy stored in that portion and the stimulated light emission after-glow emitted from all of the portions covered by the front end face 4a of the light guide member 4 simultaneously enter the light guide member 4 from the front end face 4a and are guided to the photomultiplier 5. In this case, since the area of the portions covered by the front end face 4a of the light guide member 4 is markedly larger than the area of the portion of the stimulable phosphor sheet 3 which is momentarily exposed to the laser beam 1b and which emits light upon stimulation by the laser beam 1b, the amount of the stimulated light emission after-glow guided to the photomultiplier 5 becomes not negligible even though the intensity of the stimulated light emission after-glow becomes negligibly low as compared with the intensity of the light emitted by the sheet 3 upon stimulation thereof.

The after-glows detected together with the light emitted by the stimulable phosphor sheet upon stimulation thereof by stimulating rays as described above constitutes a noise component in the electric image signals obtained by the read-out of a radiation image and make it difficult to accurately read out the radiation image.

The instantaneous light emission after-glow presents a problem particularly when image read-out is carried out immediately after a stimulable phosphor sheet is exposed to a radiation to have the radiation image stored therein. On the other hand, the stimulated light emission after-glow presents a problem particularly when the scanning speed of stimulating rays on the stimulable phosphor sheet carrying the radiation image stored therein is increased.

The effects of the after-glows on the amount of light detected by image read-out will hereinbelow be described in more detail with reference to FIGS. 4A and 4B. FIG. 4A shows a stimulable phosphor sheet 3a carrying a radiation image of the head of a human body stored therein. FIG. 4B shows a graph wherein the abscissa represents the scanning point along the line a on the stimulable phosphor sheet 3a of FIG. 4A and the ordinate represents the amount of light transmitted to a photomultiplier via a light guide member when the stimulable phosphor sheet 3a is scanned by stimulating rays (laser beam) along the line a. In FIG. 4B, the broken line 11 designates the amount of light actually transmitted to the photomultiplier, and the solid line 12 designates the amount of light emitted by the stimulable phosphor sheet 3a upon stimulation thereof when the sheet 3a is exposed to the stimulating rays. The chain line 13 designates the amount of after-glows (i.e. the sum of the instantaneous light emission after-glow and the stimulated light emission after-glow). That is, the sum of the amount 13 of the after-glows and the amount 12 of the light emitted by the stimulable phosphor sheet 3a upon stimulation thereof when the sheet 3a is exposed to the stimulating rays is equal to the light amount 11 transmitted to the photomultiplier. The light amount 11 is converted to an electric image signal by the photomultiplier and then logarithmically converted to reproduce a visible image by use of the logarithmically converted signal. In this case, the signal level obtained when the light amount 11 transmitted to the photomultiplier is converted to an electric image signal and then logarithmically converted is different from the signal level obtained when only the amount 12 of light emitted by the stimulable phosphor sheet 3a upon stimulation thereof by the stimulating rays is converted to an electric image signal and then logarithmically converted. Therefore, when a visible image is reproduced by use of the image signal obtained by converting the light amount 11 transmitted to the photomultiplier, the visible image thus reproduced becomes different from the correct image. That is, the visible image reproduced becomes incorrect or unsharp, and a very real problem arises with regard to the image quality, particularly diagnostic efficiency and accuracy.

SUMMARY OF THE INVENTION

The primary object of the present invention is to provide a radiation image read-out method which simply eliminates adverse effects of the instantaneous light emission after-glow and the stimulated light emission after-glow.

Another object of the present invention is to provide a radiation image read-out method which provides a correct image signal representing an actual radiation image, thereby making it possible to reproduce an accurate visible image.

The present invention provides a method of reading out a radiation image in which a stimulable phosphor sheet carrying a radiation image of an object stored therein is scanned by stimulating rays which cause the stimulable phosphor sheet to emit light in proportion to the radiation energy stored therein, and the emitted light is photoelectrically detected by use of a photodetector via a light guide member to obtain an electric image signal of said radiation image, wherein the improvement comprises obtaining said electric image signal of said radiation image by subtracting a signal amount corresponding to after-glows emitted by said stimulable phosphor sheet and photoelectrically detected by use of said photodetector via said light guide member when said stimulating rays are not present on said stimulable phosphor sheet after said stimulable phosphor sheet is scanned at least by one scan line by said stimulating rays from an amount of electric image signal photoelectrically detected by said photodetector via said light guide member when said stimulable phosphor sheet is scanned by said stimulating rays.

In the present invention, the photoelectric detection of the signal corresponding to the after-glows emitted by the stimulable phosphor sheet may be conducted with any timing when the stimulating rays are not present on the stimulable phosphor sheet after the stimulable phosphor sheet is scanned at least by one scan line by the stimulating rays. For example, a signal amount detected at a point of time between the end of scanning of the stimulable phosphor sheet by the stimulating rays along one scan line and the beginning of scanning of the stimulable phosphor sheet along the next scan line may be regarded as the signal amount corresponding to the after-glow for all of the scan lines. Also, a signal amount detected for each scan line before the stimulating rays start scanning along the scan line on the stimulable phosphor sheet may be regarded as the signal amount corresponding to the after-glow. (In this case, as the signal amount corresponding to the after-glows for the first scan line, it is advantageous to use the same signal amount as that for the second scan line or the signal amount detected after the stimulable phosphor sheet is scanned along the first scan line by the stimulating rays.) Alternatively, a signal amount detected once for several scan lines may be regarded as the signal amount corresponding to the after-glow for each of these scan lines.

Further, as the value of the signal amount corresponding to the after-glow, it is possible to use the value of the signal amount detected photoelectrically. It is also possible to correct the obtained signal amount on the basis of the characteristics of the stimulable phosphor sheet (e.g. the after-glow intensity and decay characteristics of the stimulable phosphor constituting the stimulable phosphor sheet), the characteristics of the radiation image (e.g. the image density and pattern), scanning conditions (e.g. intensity of the stimulating rays and scanning speed), or the like.

In the present invention, a signal amount photoelectrically detected when the stimulating rays are not present on a stimulable phosphor sheet, i.e. when the stimulable phosphor sheet is not exposed to the stimulating rays to emit light in proportion to the radiation energy stored in the sheet after the sheet is scanned at least by one scan line by the stimulating rays is regarded as the signal amount corresponding to the after-glows and subtracted from the image signal amount detected when the sheet is scanned by the stimulating rays, thereby to obtain the electric image signal of a radiation image for use in reproduction of a visible image. Accordingly, it is possible to obtain a correct amount of image signal representing the actual amount of light emitted by the stimulable phosphor sheet upon stimulation thereof when the sheet is exposed to the stimulating rays. Thus it becomes possible to reproduce an accurate and sharp visible image by use of the correct electric image signal of the radiation image.

In the case where the method of the present invention is applied after a long period has elapsed after the stimulable phosphor sheet was exposed to a radiation to have a radiation image stored therein and the amount of the instantaneous light emission after-glow is negligible, it is possible to detect the amount of the stimulated light emission after-glow as the signal amount corresponding to the after-glows and eliminate the adverse effect of the stimulated light emission after-glow.

On the other hand, in the case where the method of the present invention is applied when the scanning speed of the stimulating rays on the stimulable phosphor sheet is low and the stimulated light emission after-glow is negligible, it is possible to detect the amount of the instantaneous light emission after-glow as the signal amount corresponding to the after-glows and eliminate the adverse effect of the instantaneous light emission after-glow. When the stimulated light emission after-glow can be ignored but the instantaneous light emission after-glow cannot, it is possible to regard the signal amount photoelectrically detected before the stimulable phosphor sheet is scanned by the stimulating rays as the signal amount corresponding to the instantaneous light emission after-glow, and to subtract the signal amount from the image signal amount detected when the stimulable phosphor sheet is scanned by the stimulating rays, thereby eliminating the adverse effect of the instantaneous light emission afterglow. In this case, the value of the signal amount detected photoelectrically may be directly used as the signal amount corresponding to the instantaneous light emission after-glow. However, a value obtained by correcting the detected signal amount on the basis of the decay characteristics of the instantaneous light emission after-glow of the stimulable phosphor sheet for each scan line should preferably be used as the signal amount corresponding to the instantaneous light emission after-glow.

DESCRIPTION OF THE PREFERRED EMBODIMENTS

The present invention will hereinbelow be described in further detail with reference to the accompanying drawings.

Figure 1:
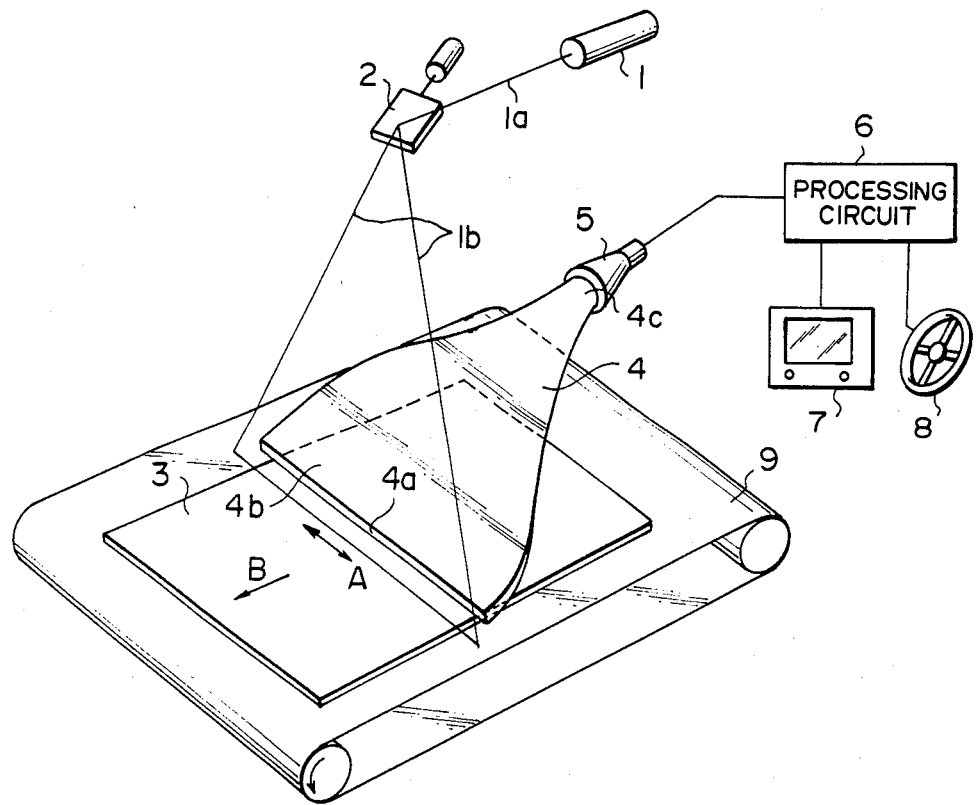
FIG. 1 is a schematic view showing an example of a radiation image read-out apparatus.
Figure 2:
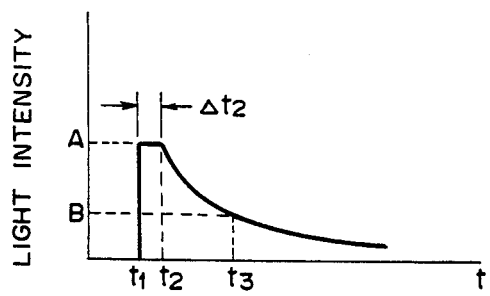
FIG. 2 is a graph showing the decay characteristics of an instantaneous light emission after-glow.
Figure 3:
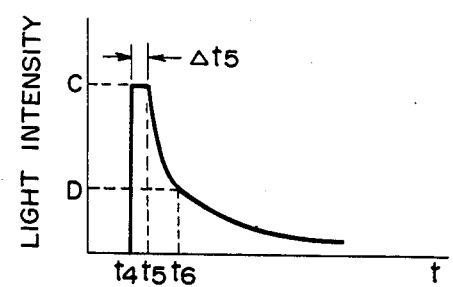
FIG. 3 is a graph showing the decay characteristics of a stimulated light emission after-glow.
Figure 4A:
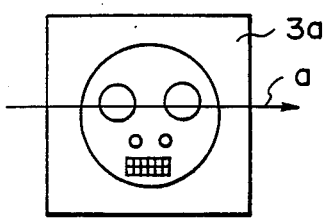
FIG. 4A is a schematic view showing a stimulable phosphor sheet carrying a radiation image of the head of a human body stored therein.
Figure 5:
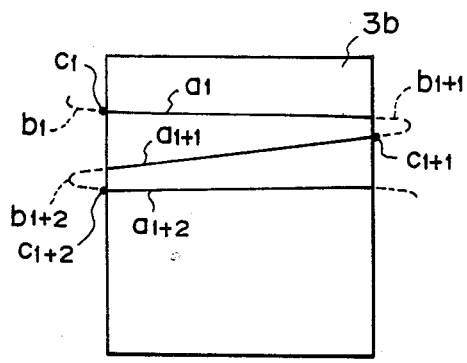
FIG. 5 is a front view showing the scan lines of stimulating rays on a stimulable phosphor sheet.
Figure 4B:
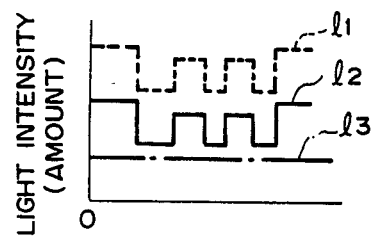
FIG. 4B is a graph showing the light emission intensity transmitted to a photomultiplier via a light guide member when the stimulable phosphor sheet shown in FIG. 4A is scanned by stimulating rays.

Referring to FIG. 5, a stimulable phosphor sheet $3b$ carrying a radiation transmission image stored therein is scanned by stimulating rays sequentially from the upper portion thereof. The solid lines $a_i$, $a_{i+1}$, and $a_{i+2}$ respectively designate the i'th scan line, the i+1'th scan line, and the i+2'th scan line on the sheet $3b$. Broken lines $b_i$, $b_{i+1}$, and $b_{i+2}$ respectively designate the scan lines outside of the sheet $3b$ before scanning advances to the scan lines $a_i$, $a_{i+1}$, and $a_{i+2}$ on the sheet $3b$. In the read-out method of the present invention, the signal amounts photoelectrically detected by use of a photodetector via a light guide member when the stimulating rays exist on the scan lines $b_i$, $b_{i+1}$, and $b_{i+2}$ are respectively regarded as the signal amounts corresponding to the after-glows, i.e. the instantaneous light emission after-glow and the stimulated light emission after-glow emitted when scannings along the scan lines $a_i$, $a_{i+1}$, and $a_{i+2}$ are conducted. The signal amounts corresponding to the after-glows are subtracted from the image signal amounts photoelectrically detected by use of the photodetector via the light guide member when scannings along the scan lines $a_i$, $a_{i+1}$, and $a_{i+2}$ are conducted, thereby obtaining electric image signals of the radiation transmission image. The signal amounts photoelectrically detected by use of the photodetector via the light guide member when the stimulating rays are present at points on the scan lines $b_i$, $b_{i+1}$, and $b_{i+2}$ as close to the sheet $3b$ as possible, for example, at points $c_i$, $c_{i+1}$, and $c_{i+2}$, should preferably be regarded as the signal amounts corresponding to the afterglow.

In the aforesaid embodiment, the sheet $3b$ is scanned by the stimulating rays along the forward scan lines and the backward scan lines. However, also when the sheet $3b$ is scanned only along the forward scan lines, the method of the present invention can be carried out in the same manner. Therefore, only the case where the sheet $3b$ is scanned along the forward and backward scan lines is described herein.

Figure 6:
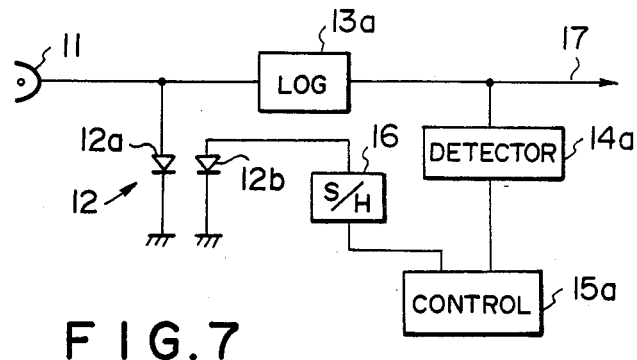
FIGS. 6 and 7 are electric circuit diagrams showing embodiments of the circuit for subtracting the signal amount corresponding to the after-glows from the image signal amount detected by a photomultiplier via a light guide member in accordance with the present invention.
Figure 7:
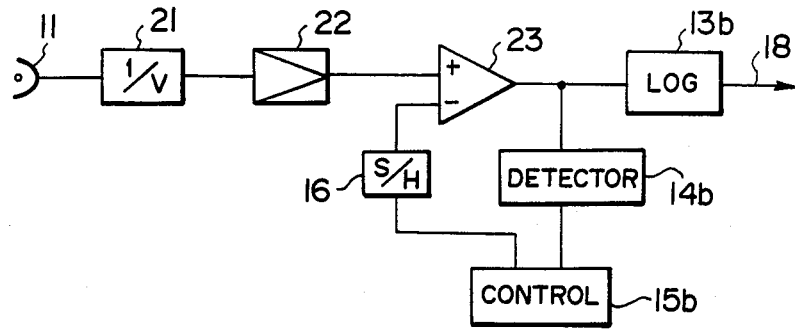

FIGS. 6 and 7 show embodiments of the circuit used for subtracting the signal amounts corresponding to the after-glows from the image signal amounts detected by scanning the sheet $3b$ as shown in FIG. 5.

In FIG. 6, the light emitted by the stimulable phosphor sheet and entering a light guide member (not shown) is guided inside of the light guide member to a photomultiplier 11 and converted by the photomultiplier 11 into an electric signal (an electric current). The photomultiplier 11 is electrically connected to a logarithmic converter 13a and a photo diode 12a which constitutes a photo coupler together with a light emitting diode 12b standing face to face with the photo diode 12a. When the light emitting diode 12b of the photo coupler 12 emits light, a part of the electric signal obtained by the conversion of light in the photomultiplier 11 is grounded via the photo diode 12a. The amount of the part of the electric signal thus grounded depends on the amount of light emitted by the light emitting diode 12b. The remaining portion of the electric signal is sent to the logarithmic converter 13a. The electric signal logarithmically converted by the logarithmic converter 13a is sent through a line 17 and stored in a memorizing medium or reproduced into a visible image on a CRT or the like. The line 17 is also connected to a detector 14a which detects the electric signal sent through the line 17. The detector 14a is connected to a control circuit 15a, which is in turn connected to the light emitting diode 12b via a sample holding circuit 16. When the stimulating rays scan outside of the stimulable phosphor sheet, i.e. on the scan lines bi, bi+1, and bi+2 in FIG. 5, the control circuit 15a feeds an electric current to the light emitting diode 12b via the sample holding circuit 16 to have the light emitting diode 12b emit light. As a result, an electric current flows through the photo diode 12a, and the amount of the electric current flowing to the line 17 becomes zero. Namely, the control circuit 15a controls so that the electric signal (electric current) corresponding to the after-glows entering the photomultiplier 11 is grounded via the photo diode 12a and does not flow to the logarithmic converter 13a.

When the stimulating rays come to points just prior to the stimulable phosphor sheet, i.e. to the points ci, ci+1, and ci+2 in FIG. 5, the control circuit 15a maintains the electric current flowing to the light emitting diode 12b by the sample holding circuit 16. Then, the control circuit 15a feeds the electric current of the same value as the maintained current to the light emitting diode 12b as long as the stimulating rays scan the stimulable phosphor sheet (i.e. as long as the stimulating rays are present on the scan lines ai, ai+1, and ai+2). Accordingly, of the electric signal amount obtained by scanning the stimulable phosphor sheet by the stimulating rays, the electric signal amount corresponding to the after-glows just prior to the scanning of the sheet by the stimulating rays (i.e. at the points ci, ci+1, and ci+2) is grounded via the photo diode 12a. As a result, the image signal obtained from the line 17 via the logarithmic converter 13a becomes an accurate one representing the actual image.

In FIG. 7, a current signal converted by the photomultiplier 11 is converted by a current-to-voltage converter 21 into a voltage signal, amplified by an amplifier 22, and then sent to the "+" input side of an adder 23. To the "−" input side of the adder 23 is fed an output of a control circuit 15b via the sample holding circuit 16. The output side of the adder 23 is connected to a logarithmic converter 13b and a detector 14b which is connected to the control circuit 14b. When the stimulating rays scan outside of the stimulable phosphor sheet, i.e. on the scan lines bi, bi+1, and bi+2 in FIG. 5, the control circuit 15b feeds a voltage signal for nullifying the input to the logarithmic converter 13b, which is detected by the detector 14b, to the "−" input side of the adder 23 via the sample holding circuit 16.

When the stimulating rays come to points just prior to the stimulable phosphor sheet, i.e. to the points ci, ci+1, and ci+2 in FIG. 5, the control circuit 15b maintains the voltage signal output to the "−" input side of the adder 23 by the sample holding circuit 16. Then, the control circuit 15b feeds the voltage signal of the same value as the maintained voltage signal to the "−" input side of the adder 23 as long as the stimulating rays scan the stimulable phosphor sheet (i.e. as long as the stimulating rays exist on the scan lines ai, ai+1, and ai+2).

Accordingly, of the electric signal amount obtained by scanning the stimulable phosphor sheet by the stimulating rays, the electric signal amount corresponding to the after-glows just prior to the scanning of the sheet by the stimulating rays (i.e. at the points ci, ci+1, and ci+2) is subtracted as the voltage output from the sample holding circuit 16 to the "−" input side of the adder 23. As a result, the image signal obtained from a line 18 via the logarithmic converter 13b becomes an accurate one representing the actual image.

In the embodiments of the circuit as shown in FIGS. 6 and 7, dark current, any signal caused by stray light of the stimulating rays or ambient light, and any drift of the amplifying system are automatically eliminated at the same time by nullifying the signal flowing to the line 17 or the input signal to the logarithmic converter 13b when the stimulating rays scan outside of the stimulable phosphor sheet.

I claim:

1. A method of reading out a radiation image in which a stimulable phosphor sheet carrying a radiation image of an object stored therein is scanned by stimulating rays which cause the stimulable phosphor sheet to emit light in proportion to the radiation energy stored therein, and the emitted light is photoelectrically detected by use of a photodetector via a light guide member to obtain an electric image signal of said radiation image, wherein the improvement comprises obtaining said electric image signal of said radiation image by subtracting a signal amount corresponding to after-glows emitted by said stimulable phosphor sheet and photoelectrically detected by use of said photodetector via said light guide member when said stimulating rays are not present on said stimulable phosphor sheet after said stimulable phosphor sheet is scanned at least by one scan line by said stimulating rays from an amount of electric image signal photoelectrically detected by said photodetector via said light guide member when said stimulable phosphor sheet is scanned by said stimulating rays.

2. A method as defined in claim 1 wherein said signal amount corresponding to after-glows emitted by said stimulable phosphor sheet is detected for each scan line of said stimulating rays.

3. A method as defined in claim 1 wherein said signal amount corresponding to after-glows emitted by said stimulable phosphor sheet is detected when said stimulating rays are present at a point as close to the stimulable phosphor sheet as possible outside of the stimulable phosphor sheet.

4. A method as defined in claim 1 wherein the subtraction of said signal amount corresponding to afterglow emitted by said stimulable phosphor sheet from said amount of electric image signal photoelectrically detected by said photodetector is conducted by reducing to zero said signal amount corresponding to afterglow emitted by said stimulable phosphor sheet by grounding said signal amount as long as said stimulable phosphor sheet is scanned by said stimulating rays.

5. A method as defined in claim 1 wherein the subtraction of said signal amount corresponding to afterglow emitted by said stimulable phosphor sheet from said amount of electric image signal photoelectrically detected by said photodetector is conducted by feeding said amount of electric image signal photoelectrically detected by said photodetector to the positive input terminal of an adder and feeding said signal amount corresponding to after-glow to the negative input terminal of said adder as long as said stimulable phosphor sheet is scanned by said stimulating rays.

* * * * *